US009066266B2

(12) United States Patent
Won et al.

(10) Patent No.: US 9,066,266 B2
(45) Date of Patent: Jun. 23, 2015

(54) APPARATUS AND METHOD FOR TRANSMITTING/RECEIVING SYSTEM INFORMATION IN BROADBAND WIRELESS COMMUNICATION SYSTEM

(75) Inventors: Jong-Hyun Won, Seongnam-si (KR); Ji-Yun Seol, Seongnam-si (KR); Mi-Hyun Lee, Seongnam-si (KR); Doo-Hee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 535 days.

(21) Appl. No.: 12/905,656

(22) Filed: Oct. 15, 2010

(65) Prior Publication Data
US 2011/0090884 A1 Apr. 21, 2011

(30) Foreign Application Priority Data
Oct. 15, 2009 (KR) .................. 10-2009-0098145
Oct. 27, 2009 (KR) .................. 10-2009-0102342

(51) Int. Cl.
*H04W 4/00* (2009.01)
*H04W 28/18* (2009.01)
*H04W 24/02* (2009.01)
*H04W 48/08* (2009.01)
*H04W 48/16* (2009.01)
*H04W 88/08* (2009.01)

(52) U.S. Cl.
CPC .............. *H04W 28/18* (2013.01); *H04W 24/02* (2013.01); *H04W 48/08* (2013.01); *H04W 48/16* (2013.01); *H04W 88/08* (2013.01)

(58) Field of Classification Search
USPC ........................................................ 370/338
See application file for complete search history.

(56) References Cited

U.S. PATENT DOCUMENTS

| 2008/0043650 | A1 | 2/2008 | Jang et al. |
| 2009/0161591 | A1 | 6/2009 | Ahmadi et al. |
| 2010/0205283 | A1 | 8/2010 | Cho et al. |
| 2010/0226389 | A1* | 9/2010 | Cho et al. ................ 370/465 |
| 2011/0002320 | A1* | 1/2011 | Yuk et al. ................. 370/338 |
| 2011/0134896 | A1* | 6/2011 | Venkatachalam et al. .... 370/338 |
| 2013/0028206 | A1* | 1/2013 | Cho et al. ................ 370/329 |

FOREIGN PATENT DOCUMENTS

| CN | 102318235 A | 1/2012 |
| JP | 2012-517181 A | 7/2012 |
| KR | 10-2009-0094736 A | 9/2009 |
| WO | 2009/123410 A1 | 10/2009 |

* cited by examiner

*Primary Examiner* — Sulaiman Nooristany
(74) *Attorney, Agent, or Firm* — Jefferson IP Law, LLP

(57) ABSTRACT

An apparatus and method for transmission/reception of system information in a broadband wireless communication system are provided. An operation of a Base Station (BS) in a broadband wireless communication system includes determining whether to apply a system configuration corresponding to a previous value of a Secondary-Super Frame Header (S-SFH) change count changed according to update of system information and, when applying the system configuration corresponding to the previous value of the S-SFH change count, setting a parameter representing the applied system configuration to a first value and, when applying a system configuration corresponding to a current value of the S-SFH change count, setting the parameter to a second value, and transmitting a Primary-Super Frame Header (P-SFH) including the S-SFH change count and the parameter set to the first value or the second value.

34 Claims, 8 Drawing Sheets

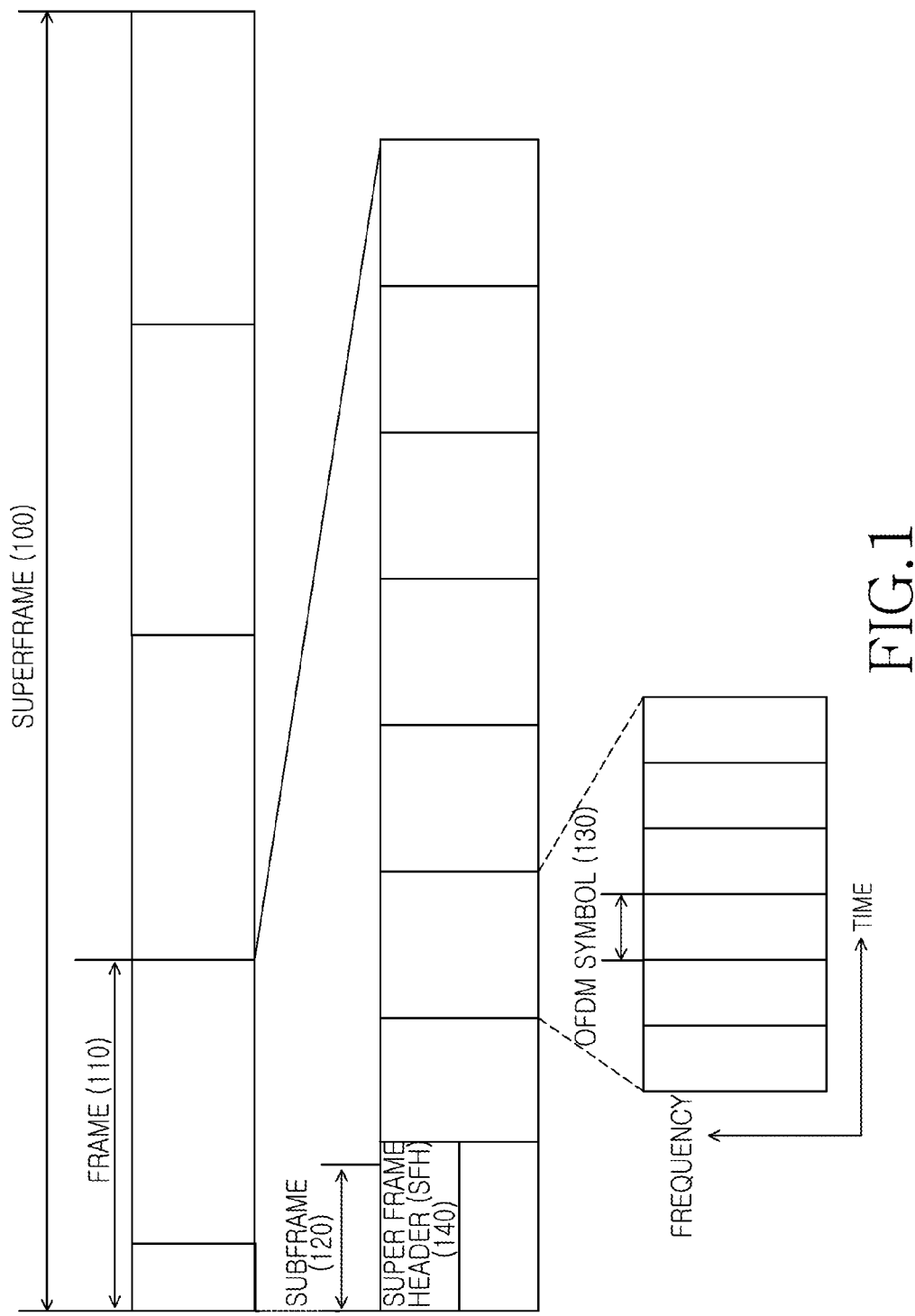

APPARATUS AND METHOD FOR TRANSMITTING/RECEIVING SYSTEM INFORMATION IN BROADBAND WIRELESS COMMUNICATION SYSTEM

PRIORITY

This application claims the benefit under 35 U.S.C. §119 (a) to a Korean patent application filed in the Korean Intellectual Property Office on Oct. 15, 2009 and assigned Serial No. 10-2009-0098145 and a Korean patent application filed in the Korean Intellectual Property Office on Oct. 27, 2009 and assigned Serial No. 10-2009-0102342, the entire disclosures of both of which are hereby incorporated by reference.

BACKGROUND OF THE INVENTION

1. Field of the Invention

The present invention relates to a broadband wireless communication system. More particularly, the present invention relates to an apparatus and method for transmitting/receiving system information in a broadband wireless communication system.

2. Description of the Related Art

At present, a mobile communication system is evolving beyond voice-centric communication to provide a variety of services such as broadcasting, a multimedia video, a multimedia message, etc. Examples of this next-generation communication system are an Institute of Electrical and Electronics Engineers (IEEE) 802.16e system, a 3-Generation Partnership Project (3GPP) Long Term Evolution (LTE) system that is now under standardization, an IEEE 802.20 Ultra Mobile Broadband (UMB) system, an IEEE 802.16m system, and the like.

In order to support a high data transmission speed in the mobile communication system, various transmission techniques such as the use of a multiple antenna system, Hybrid Auto Repeat reQuest (HARQ), Adaptive Modulation and Coding (AMC), and the like are being introduced. In order for these transmission techniques to be managed, a Base Station (BS) has to transmit a significant amount of system information to a plurality of user Mobile Stations (MSs). The system information includes network and cell information that a user MS must be aware of to perform mobile communication within a cell. For example, the information may include bandwidth information of the cell, configuration information of a physical channel, information of a parameter, etc. of an upper layer, etc., and information of various transmission techniques supported in the cell, for example, number of transmit antennas, information of a multiple antenna, HARQ related information, modulation scheme information, etc.

According to the IEEE 802.16m standard, which is one of the wireless communication standards, system information is transmitted in a form of a Primary-Super Frame Header (P-SFH) and a Secondary-Super Frame Header (S-SFH). The S-SFH is divided into a SubPacket1 (SP1), an SP2, and an SP3. Transmission periods of the SP1, the SP2, and the SP3 can be different from each other. The P-SFH includes information informing if the S-SFH is transmitted in the same frame in which SP is transmitted, and its size. Also, the P-SFH represents a change of the system information using an S-SFH change count and an S-SFH SP change bitmap. The P-SFH informs which SP is transmitted in the same frame using an S-SFH scheduling information bitmap.

The S-SFH change count is mapped to transmitted SPs. For example, in case that the S-SFH change count is equal to 'N', transmitted SP1, SP2, and SP3 include system parameters of a state of 'S-SFH Change Count=N'. Accordingly, a change of the S-SFH change count means that at least one of the SPs of the S-SFH has been updated. The S-SFH SP change bitmap represents which SP has been changed. Also, each SPx includes an offset parameter of two bits indicating an offset of a superframe in which the use of a changed SP starts, and indicates when a new configuration changed through the offset parameter is applied. Accordingly, after receiving a new SPx, the MS applies new parameters in the superframe indicated by the offset parameter within the SPx.

The S-SFH change count and the S-SFH SP change bitmap included in the P-SFH indicate that the system information has been updated and which SP has been updated. However, although the MS recognizes the update of the system information and the updated SPx by receiving the P-SFH, in a case in which the MS fails to receive the updated SPx due to channel degradation, an operation state of a sleep mode, etc., the MS must stop communication because it is not aware of a time point of application of the updated SPx. Accordingly, the MS cannot perform communication until successfully decoding the SPx. Thus, there is a need for an alternative for, although failing to receive an updated SPx, enabling an MS to perform communication until before application of updated system information, by recognizing a time point of application of the updated SPx.

SUMMARY OF THE INVENTION

An aspect of the present invention is to address at least the above-mentioned problems and/or disadvantages and to provide at least the advantages below. Accordingly, an aspect of the present invention is to provide an apparatus and method for informing of a time point of application of updated system information in a broadband wireless communication system.

Another aspect of the present invention is to provide an apparatus and method for informing of a time point of application of updated system information through an Information Element (IE) transmitted every superframe in a broadband wireless communication system.

A further aspect of the present invention is to provide an apparatus and method for simultaneously updating SubPackets (SPs) of a plurality of pieces of system information in a broadband wireless communication system.

The above aspects are achieved by providing an apparatus and method for transmitting/receiving system information in a broadband wireless communication system.

In accordance with an aspect of the present invention, an operation method of a Base Station (BS) in a broadband wireless communication system is provided. The method includes determining whether to apply a system configuration corresponding to a previous value of a Secondary-Super Frame Header (S-SFH) change count changed according to update of system information and, when applying the system configuration corresponding to the previous value of the S-SFH change count, setting a parameter representing the applied system configuration to a first value and, when applying a system configuration corresponding to a current value of the S-SFH change count, setting the parameter to a second value, and transmitting a Primary-Super Frame Header (P-SFH) including the S-SFH change count and the parameter set to the first value or the second value.

In accordance with another aspect of the present invention, an operation method of a Mobile Station (MS) in a broadband wireless communication system is provided. The method includes identifying a value of a parameter representing an applied system configuration and a value of an S-SFH change count changed according to update of system information, the parameter and the S-SFH change count being included in a P-SFH received through an SFH and, in case that the value of the parameter is equal to a first value, applying a system configuration corresponding to a previous value of the S-SFH change count and performing communication and, in case that the value of the parameter is equal to a second value, applying a system configuration corresponding to a current value of the S-SFH change count and performing communication.

In accordance with a further aspect of the present invention, an operation method of an MS in a broadband wireless communication system is provided. The method includes identifying an S-SFH change count changed according to update of system information, the S-SFH change count being included in a P-SFH received through an SFH and, in case that a value of the S-SFH change count increases, identifying updated at least one of SPs of an S-SFH using an S-SFH SP change bitmap included in the P-SFH, determining a time point of transmission of the updated at least one SP, determining a superframe applying a system configuration corresponding to a current value of the S-SFH change count using the time point of transmission of the SP and, if the determined superframe arrives, applying the system configuration corresponding to the current value of the S-SFH change count and performing communication.

In accordance with yet another aspect of the present invention, a BS apparatus in a broadband wireless communication system is provided. The apparatus includes a determiner and a transmitter. The determiner determines whether to apply a system configuration corresponding to a previous value of an S-SFH change count changed according to update of system information. After that, when applying the system configuration corresponding to the previous value of the S-SFH change count, the determiner sets a parameter representing the applied system configuration to a first value. When applying a system configuration corresponding to a current value of the S-SFH change count, the determiner sets the parameter to a second value. The transmitter transmits a P-SFH including the S-SFH change count and the parameter set to the first value or the second value.

In accordance with still another aspect of the present invention, an MS apparatus in a broadband wireless communication system is provided. The apparatus includes a manager and a controller. The manager identifies a value of a parameter representing an applied system configuration and a value of an S-SFH change count changed according to update of system information. The parameter and the S-SFH change count are included in a P-SFH received through an SFH. In case that the value of the parameter is equal to a first value, the controller applies a system configuration corresponding to a previous value of the S-SFH change count and performs communication. In case that the value of the parameter is equal to a second value, the controller applies a system configuration corresponding to a current value of the S-SFH change count and performs communication.

In accordance with still another aspect of the present invention, an MS apparatus in a broadband wireless communication system is provided. The apparatus includes a manager and a controller. The manager identifies an S-SFH change count changed according to update of system information. The S-SFH change count is included in a P-SFH received through an SFH. In case that a value of the S-SFH change count increases, the manager identifies updated at least one of SPs of an S-SFH using an S-SFH SP change bitmap included in the P-SFH, determines a time point of transmission of the updated at least one SP, and determines a superframe applying a system configuration corresponding to a current value of the S-SFH change count using the time point of transmission of the SP. If the determined superframe arrives, the controller applies the system configuration corresponding to the current value of the S-SFH change count and performs communication.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 1 is a diagram illustrating a frame structure in a broadband wireless communication system according to an exemplary embodiment of the present invention;

Throughout the drawings, it should be noted that like reference numbers are used to depict the same or similar elements, features, and structures.

DETAILED DESCRIPTION OF EXEMPLARY EMBODIMENTS

Figure 2A:
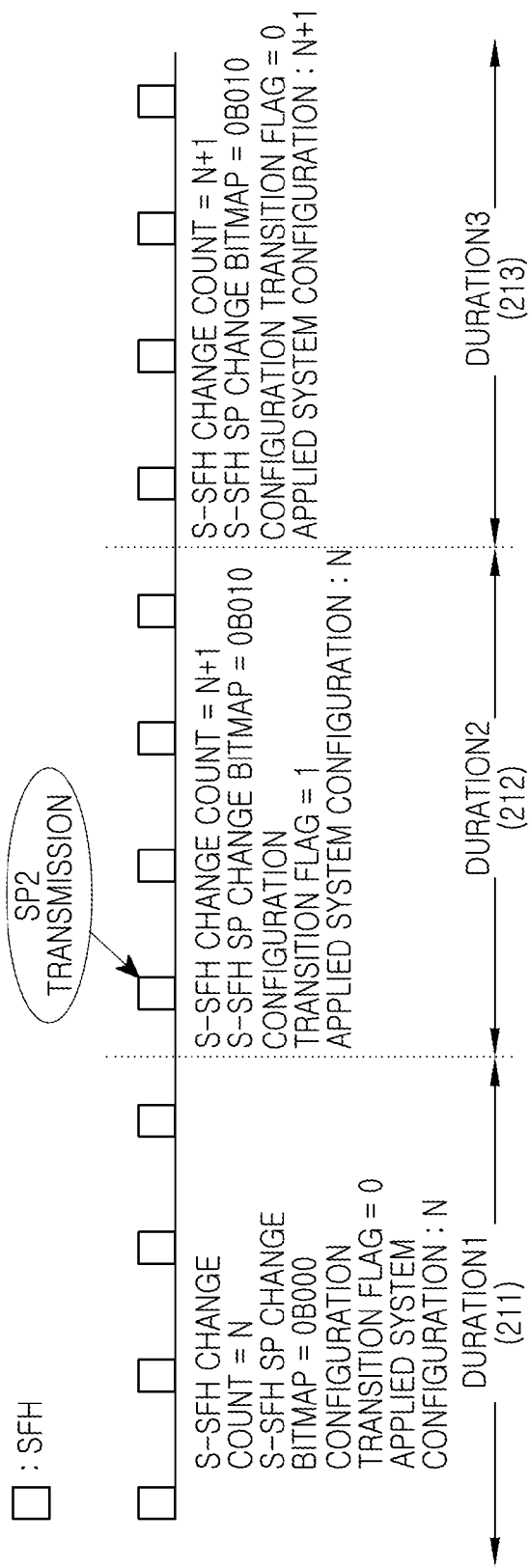
FIGS. 2A to 2C are diagrams illustrating a time point of transmission of system information in a broadband wireless communication system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for purposes of illustration only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

An exemplary technology for informing of a time point of application of updated system information in a broadband wireless communication system according to the present invention is described below. The following description is made with reference to an Orthogonal Frequency Division Multiplexing (OFDM)/Orthogonal Frequency Division Multiple Access (OFDMA) wireless communication system, but is applicable to other wireless communication systems.

FIG. 1 illustrates a frame structure in a broadband wireless communication system according to an exemplary embodiment of the present invention.

Referring to FIG. 1, a superframe 100 is divided into a plurality of frames 110, and the frame 110 is divided into subframes 120 comprised of a plurality of OFDM symbols 130. A first subframe 120 of a first frame 110 within the superframe 100 includes a Super Frame Header (SFH) 140. The SFH 140 includes a synchronization channel, a common control channel, and the like. The SFH 140 is a region for transmitting system information necessary for a Mobile Station (MS) to perform communication with a corresponding Base Station (BS). The system information is divided into a Primary-Super Frame Header (P-SFH) and a Secondary-Super Frame Header (S-SFH). The S-SFH is divided into a SubPacket1 (SP1), an SP2, and an SP3. For description convenience, the SP1, the SP2, and the SP3 are generally referred to as 'SPx' below.

The S-SFH is always included in the SFH 140, and the SPx is selectively included in the SFH 140. For example, each SPx is transmitted according to a corresponding period. In case that the SPx is included in the SFH 140, the SPx is mapped to resources located in succession of resources occupied by the P-SFH. Thus, an MS can extract the SPx within the frame using SPx size information included in the P-SFH. The P-SFH and each SPx are distinguished according to the kind of a parameter included. A construction of a concrete parameter of each Information Element (IE) can be different according to the user's intention. For example, Table 1 to Table 4 below show parameters included in the P-SFH and the SPx. In more detail, Table 1 below shows the parameters included in the P-SFH, Table 2 below shows the parameters included in the SP1, Table 3 below shows the parameters included in the SP2, and Table 4 below shows the parameters included in the SP3.

TABLE 1

| Parameter | Description |
| --- | --- |
| LSB of superframe number | Part of superframe number |
| S-SFH change count | Describes the S-SFH SPx IE applied to this superframe. |
| S-SFH size | The units of LRU |
| S-SFH transmission format | Indicate the transmission format (repetition) used for S-SFH |

TABLE 1-continued

| Parameter | Description |
| --- | --- |
| S-SFH scheduling information bitmap | 0b000: no S-SFH<br>If $1^{st}$ bit = 1, S-SFH includes SP1 otherwise no SP1<br>If $2^{nd}$ bit = 1, S-SFH includes SP2 otherwise no SP2<br>If $3^{rd}$ bit = 1, S-SFH includes SP3 otherwise no SP3<br>Indicate the change of S-SFH SPx IE. The bit#0 to bit#2 is mapped to S-SFH SP1 IE to S-SFH SP3 IE, respectively. |
| S-SFH SP change bitmap | Indicate which SPx in IE is updated. |

TABLE 2

| Parameter | Description |
| --- | --- |
| MSB of superframe number | Remaining bit of SFN except LSB of SFN in P-SFH |
| LSB of ABS ID | Specifies the 24 least bit of ABS ID |
| Periodicity of A-MAP | 0b0: every subframe<br>0b1: every 2 subframes |
| A-MAP transmission format | 0b0: ½ or ¼ code rate for assignment A-MAP<br>0b1: ½ or ⅛ code rate for assignment A-MAP |
| DL permutation configuration (CRU, DRU partitioning and signaling related to that) | DL_CAS_SB0(4), DL_CAS_MB0(6), DL CAS_SBi(4 × 3) (Up to 22 bits, Need the decision from DL physical structure section) |
| UL permutation configuration (CRU, DRU partitioning and signaling related to that) | UL_CAS_SB0(4), UL_CAS_MB0(6), UL CAS_SBi(4 × 3) (Up to 22 bits, Need the decision from DL physical structure section) |
| Initial ranging channel information (initial ranging region location) | (Need the decision from UL Ctrl section) |
| RNG codes information | Parameters for determining the root sequences and their cyclic shifts in the preamble set for the cell (Up to 12 bits, Need the decision from UL Ctrl section) |
| HO ranging codes | 64 RNG codes (Need the decision form UL Ctrl section) |
| HO Ranging backoff start | Initial backoff window size for HO ranging contention, expressed as a power of 2. Values of n range 0-15 (the highest order bits shall be unused and set to 0) (Need the decision from UL Ctrl or MAC operation section) |
| HO Ranging backoff end | Final backoff window size for HO ranging contention, expressed as a power of 2. Values of n range 0-15 (the highest order bits shall be unused and set to 0) (Need the decision from UL Ctrl or MAC operation section) |
| ABS EIRP | Signed in units of 1 dBm |
| Cell bar information | If Cell Bar bit = 1, this cell is not allowed for any initial entry |

TABLE 3

| Parameter | Description |
| --- | --- |
| Duplexing mode | |
| Sub-frame configuration (DL/UL ratio, duplexing mode) | |
| If(Duplexing mode == FDD) {<br>  UL carrier frequency<br>  UL bandwidth<br>} | |
| MSB bytes of BSID | Specifies the Operator ID |
| FFR partitioning info for DL region | DL_SAC(4), DL_FPSC(3), DL_FPC(4) (Up to 11 bits, Need the decision from DL Physical structure section) |

TABLE 3-continued

| Parameter | Description |
|---|---|
| FFR partitioning info for UL region | UL_SAC(4), UL_FPSC(3), UL_FPC(4) (Up to 11 bits, Need the decision from UL Physical structure section) |
| Initial ranging codes | 64RNG codes (Need the decision from UL Ctrl section) |
| Initial ranging backoff start | Initial backoff window size for initial ranging contention, expressed as a power of 2. Values of n range 0-15 (Need the decision from UL Ctrl or MAC operation section) |
| Bandwidth request backoff start | Initial backoff window size for contention BRs, expressed as a power of 2. Values of n range 0-15 (the highest order bits shall be unused and set to 0) (Need the decision from UL Ctrl or MAC operation section) |
| Bandwidth request backoff end | Final backoff window size for contention BRs, expressed as a power of 2. Values of n range )-15 (Need the decision from UL Ctrl or MAC operation section) |
| NSP ID | Network service provider ID |
| Additional broadcast information indicator(ABI) | |
| AMS Transmit Power Limitation Level | Unsigned 8-bit integer. Specifies the maximum allowed AMS transmit power. Values indicate power levels in 1 dB steps from 0 dBm |
| Minimum level of power offset adjustment | |
| Maximum level of power offset adjustment | |

TABLE 4

| Parameter | Description |
|---|---|
| Rate of change of SP(1-3) info | |
| SA-sequence soft partitioning information | |
| FFR partition resource metrics | |
| MIMO rank 1 OL region signaling | |
| MIMO rank 1 OL region | |
| NI information for UL power control | |
| Periodic ranging channel information (periodic ranging region location) | Need the decision from UL Ctrl section |
| Periodic ranging codes | 64RNG codes (Need the decision from UL Ctrl section) |
| Periodic ranging backoff start | Initial backoff window size for periodic ranging contention, expressed as a power of 2. Values of n range 0-15 (Need the decision from UL Ctrl or MAC operation section) |
| Periodic ranging backoff end | Final backoff window size for periodic ranging contention, expressed as a power of 2. Values of n range 0-15 (Need the decision from UL Ctrl or MAC operation section) |
| UL FB Size | Specifies the size of UL feedback channel per a UL subframe (Need the decision from UL Ctrl section) |
| #Tx antenna | 0b00: 2 antennas<br>0b01: 4 antennas<br>0b10: 8 antennas<br>0b11: reserved |

TABLE 4-continued

| Parameter | Description |
|---|---|
| Default RSSI and CINR averaging parameter | Bits 0-3: Default averaging parameter αavg for physical CINR measurements, in multiple of 1/16<br>Bits 4-7: Default averaging parameter αavg for RSSI measurements, in multiple of 1/16 |
| Tx Power report | |
| SP scheduling periodicity information | |

A BS according to an exemplary embodiment of the present invention includes a Configuration Transition Flag (CTF) within the P-SFH. The CTF is a parameter representing the application or non-application of a system configuration corresponding to a current value of an S-SFH change count. The CTF is defined in Table 5 below. The CTF can be called a different name in actual implementation. For example, the CTF can be called an S-SFH application hold indicator.

TABLE 5

| Syntax | Size (bit) | Notes |
|---|---|---|
| Configuration Transition Flag (CTF) | 1 | 0: application of system configuration corresponding to current value of S-SFH change count<br>1: application of system configuration corresponding to previous value of S-SFH change count |

In case that the current value of the S-SFH change count is equal to 'N' and the CTF is equal to '0', an MS applies a system configuration corresponding to the S-SFH change count (N) (i.e., a system configuration dependent on system information being currently in transmission). On the contrary, in case that the current value of the S-SFH change count is equal to 'N' and the CTF is equal to '0', the MS applies a system configuration corresponding to the S-SFH change count (N−1) (i.e., a system configuration dependent on system information transmitted when the S-SFH change count is equal to 'N−1').

As the P-SFH includes the CTF, transmission/reception of the system information is performed as follows.

Figure 2B:
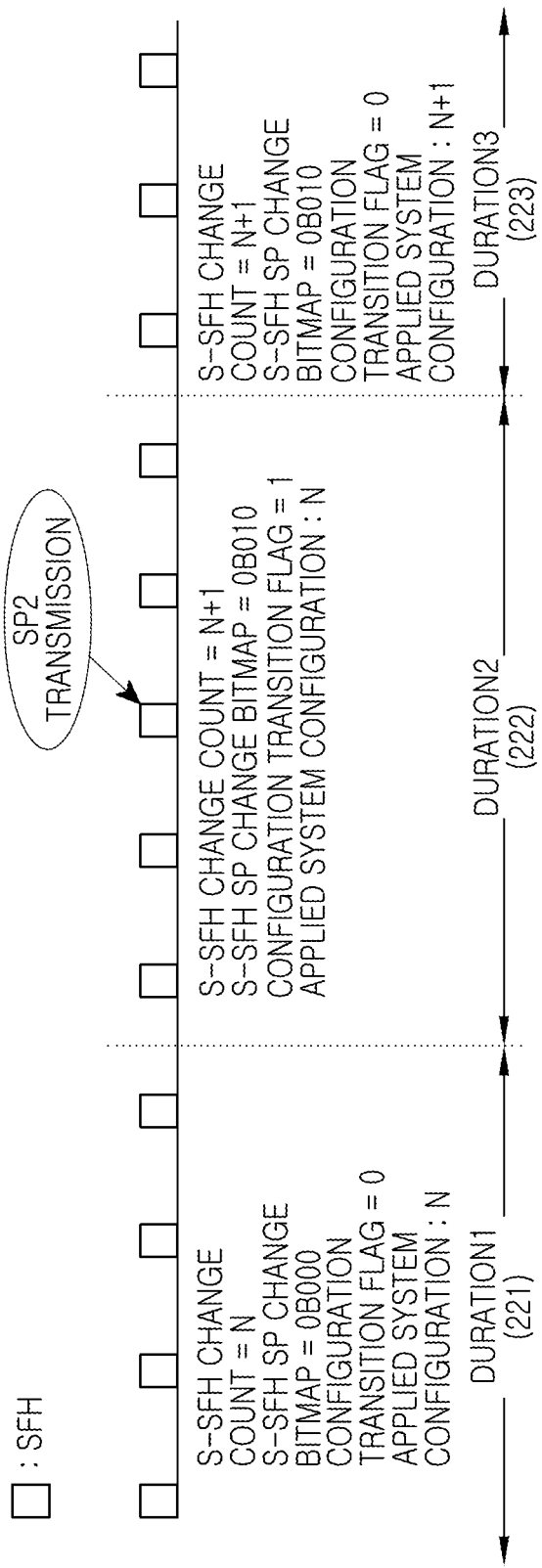
Figure 2C:
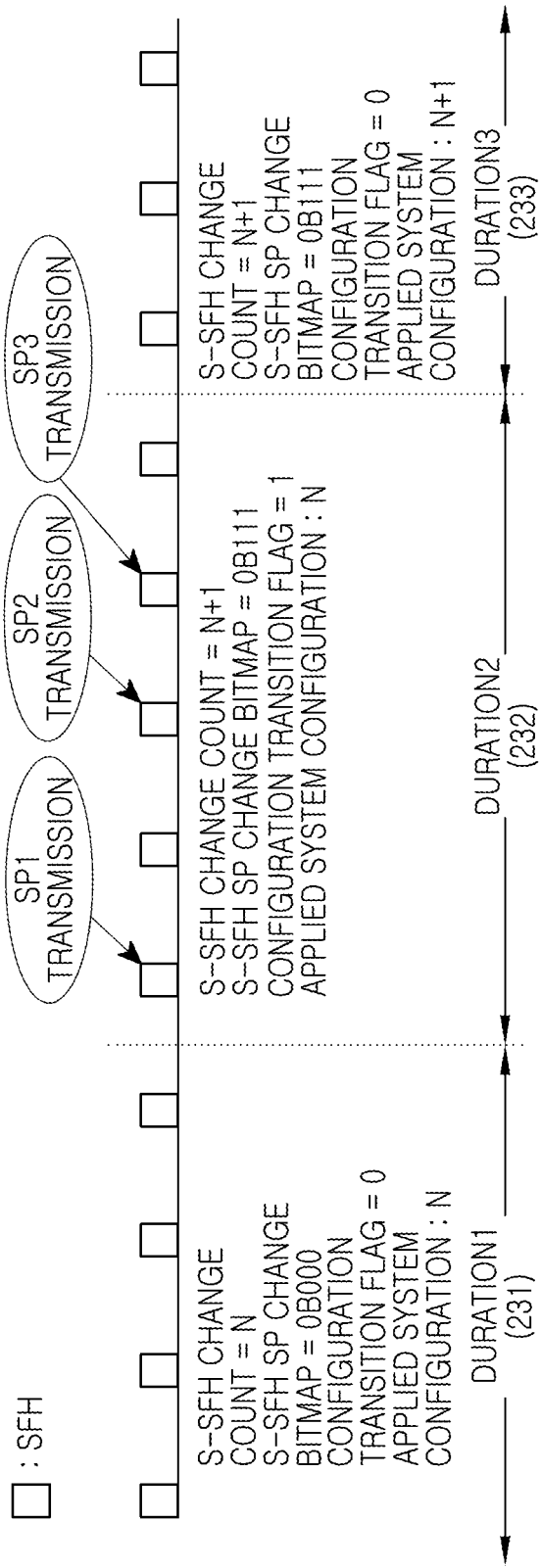

FIGS. 2A to 2C illustrate a time point of transmission of system information in a broadband wireless communication system according to an exemplary embodiment of the present invention. FIG. 2A illustrates a case in which an SPx updated together with an increase of an S-SFH change count is transmitted.

Referring to FIG. 2A, during a duration1 211, the S-SFH change count is equal to 'N', and an S-SFH SP change bitmap is equal to '0b000'. At this time, because a CTF is equal to '0', a system configuration dependent on SPx corresponding to a current value of the S-SFH change count is applied. Therefore, an MS newly entering a BS receives the SPx currently transmitted, and applies the system configuration dependent on the received SPx.

During a duration2 212, due to update of an SP2, the S-SFH change count becomes 'N+1', and the S-SFH SP change bitmap becomes '0b010'. Here, that a second bit of the S-SFH SP change bitmap is changed into '1' according to the update of the SP2 is the result according to the rule of informing update of an SPx. Here, the rule is one of toggling a bit corresponding to the updated SPx and setting a value of a bit corresponding to the updated SPx to '1'. Because the S-SFH change count increases, an MS recognizes that system information has been updated. Through the S-SFH SP change bitmap, the MS determines that the SP2 has been updated. Also, the SP2 is transmitted through a frame of a time point at which the S-SFH change count increases and thus, by decoding the SP2, the MS acquires updated system information, and stores the acquired system information. However, because the CTF is equal to '1', a currently applied system configuration accords to the system information of when the S-SFH change count is equal to 'N'. Thus, the MS does not apply the stored SP2, and reflects an SP2, which is received during the duration1 211, in the system configuration.

During a duration3 213, the system information is not updated, but the CTF is changed into '0'. Accordingly, the MS recognizes that the system configuration dependent on the system information changed during the duration2 212 is applied, and applies the SP2 received and stored during the duration2 212. In FIG. 2A, during the duration3 213, the CTF is changed into '0', but the S-SFH SP change bitmap still maintains the '0b010'. However, according to an exemplary embodiment of the present invention, the S-SFH SP change bitmap can be initialized to '0b000' at the same time when the CTF is changed into '0'.

In the exemplary embodiment illustrated in FIG. 2A, the system configuration corresponding to the current value of the S-SFH change count is applied at a time point at which the CTF is changed into '0'. However, according to another exemplary embodiment of the present invention, the system configuration corresponding to the current value of the S-SFH change count can be applied after the lapse of a number of superframes from the time point at which the CTF is changed into '0', for example, from a next superframe.

FIG. 2B illustrates a case that an SPx updated after an increase of an S-SFH change count is transmitted. Referring to FIG. 2B, during a duration1 221, the S-SFH change count is equal to 'N', and an S-SFH SP change bitmap is equal to '0b000'. At this time, because a CTF is equal to '0', a system configuration dependent on SPx corresponding to a current value of the S-SFH change count is applied. Therefore, an MS newly entering a BS receives the SPx currently transmitted, and applies the system configuration dependent on the received SPx.

During a duration2 222, due to update of an SP2, the S-SFH change count becomes 'N+1', and the S-SFH SP change bitmap becomes '0b010'. That a second bit of the S-SFH SP change bitmap is changed into '1' according to the update of the SP2 is the result according to the rule of informing update of an SPx. Here, the rule is one of toggling a bit corresponding to the updated SPx and setting a value of a bit corresponding to the updated SPx to '1'. Because the S-SFH change count increases, an MS recognizes that system information has been updated. Through the S-SFH SP change bitmap, the MS determines that the SP2 has been updated. But, unlike the case of FIG. 2A, the updated SP2 is not transmitted through a frame of a time point at which the S-SFH change count increases. However, because the CTF is equal to '1', a currently applied system configuration accords to the system information of when the S-SFH change count is equal to 'N'. Thus, irrespective of reception or non-reception of the SP2, the MS reflects an SP2 received during the duration1 221, in the system configuration. After a few superframes lapse from a change of the S-SFH change count and the S-SFH SP change bitmap, the SP2 is transmitted. Accordingly, by decoding the SP2, the MS acquires updated system information, and stores the acquired system information. At this time, because the CTF is maintained as '1', the MS does not apply the stored SP2 and applies the SP2 received during the duration1 221.

During a duration3 223, the system information is not updated, but the CTF is changed into '0'. Accordingly, the MS recognizes that the system configuration dependent on the system information changed during the duration2 222 is applied, and applies the SP2 received and stored during the duration2 222. In FIG. 2B, during the duration3 223, the CTF is changed into '0', but the S-SFH SP change bitmap still maintains the '0b010'. However, according to another exemplary embodiment of the present invention, the S-SFH SP change bitmap can be initialized to '0b000' at the same time when the CTF is changed into '0'.

In the exemplary embodiment illustrated in FIG. 2B, the system configuration corresponding to the current value of the S-SFH change count is applied at a time point at which the CTF is changed into '0'. However, according to another exemplary embodiment of the present invention, the system configuration corresponding to the current value of the S-SFH change count can be applied after the lapse of a predetermined number of superframes from the time point at which the CTF is changed into '0', for example, from a next superframe.

FIG. 2C illustrates a case that an SPx updated after an increase of an S-SFH change count is transmitted. Referring to FIG. 2C, during a duration1 231, the S-SFH change count is equal to 'N', and an S-SFH SP change bitmap is equal to '0b000'. At this time, because a CTF is equal to '0', a system configuration dependent on SPx corresponding to a current value of the S-SFH change count is applied. Therefore, an MS newly entering a BS receives the SPx currently transmitted, and applies the system configuration dependent on the received SPx.

During a duration2 232, due to a change of an SP1, an SP2 and an SP3, the S-SFH change count becomes 'N+1', and the S-SFH SP change bitmap becomes '0b111'. Here, that first, second, and third bits of the S-SFH SP change bitmap are changed into '1' according to the update of the SP1, the SP2, and the SP3 is the result according to the rule of informing update of an SPx. Here, the rule is one of toggling a bit corresponding to the updated SPx and setting a value of a bit corresponding to the updated SPx to '1'. Because the S-SFH change count increases, an MS recognizes that system information has been updated. Through the S-SFH SP change bitmap, the MS determines that the SP1, the SP2, and the SP3 have been updated. At this time, only the SP1 is transmitted through a frame of a time point at which the S-SFH change count increases, and the SP2 and the SP3 are not transmitted. However, because the CTF is equal to '1', a currently applied system configuration accords to the system information of when the S-SFH change count is equal to 'N'. Thus, the MS decodes and stores the SP1 and, irrespective of reception or non-reception of the SP2 and the SP3, the MS reflects SPx, which are received during the duration1 231, in the system configuration. After a few superframes lapse from a change of the S-SFH change count and the S-SFH SP change bitmap, the SP2 and the SP3 are transmitted in regular sequence. Accordingly, by decoding the SP2 and the SP3, the MS acquires updated system information, and stores the acquired system information. At this time, because the CTF is maintained as '1', the MS does not apply the stored SPx and applies the SPx received during the duration1 231.

During a duration3 233, the system information is not updated, but the CTF is changed into '0'. Accordingly, the MS recognizes that the system configuration dependent on the system information changed during the duration2 232 is applied, and applies the SPx received and stored during the duration2 232. In FIG. 2C, during the duration3 233, the CTF is changed into '0', but the S-SFH SP change bitmap still maintains the '0b010'. However, according to another exemplary embodiment of the present invention, the S-SFH SP change bitmap can be initialized to '0b000' at the same time when the CTF is changed into '0'.

In the exemplary embodiment illustrated in FIG. 2C, the system configuration corresponding to the current value of the S-SFH change count is applied at a time point at which the CTF is changed into '0'. However, according to another exemplary embodiment of the present invention, the system configuration corresponding to the current value of the S-SFH change count can be applied after the lapse of a number of superframes from the time point at which the CTF is changed into '0', for example, from a next superframe.

In a procedure described with reference to FIGS. 2A to 2C, a BS determines to apply a system configuration corresponding to a previous value of an S-SFH change count during a predetermined duration. Here, a criterion of whether to apply the system configuration corresponding to the previous value of the S-SFH change count can be different according to the user's intention.

For example, whether to apply the system configuration corresponding to the previous value of the S-SFH change count can be determined depending on whether MSs accessing the BS receive all of updated SPx. In this case, the BS can determine the application or non-application of the system configuration corresponding to the previous value of the S-SFH change count, using a distribution of listening durations of sleep mode or idle mode MSs and a time point of transmission of the updated SPx. Accordingly, if all the MSs have the listening duration in at least one of the time points of transmission of the updated SPx, the BS determines to apply a system configuration corresponding to a current value of the S-SFH change count.

For another example, in case that at least one updated SPx is not transmitted at a superframe in which the S-SFH change count and the S-SFH SP change bitmap are changed, whether to apply the system configuration corresponding to the previous value of the S-SFH change count can be determined depending on whether transmission of the at least one updated SPx has been completed. In this case, after the transmission of the at least one updated SPx is completed, the BS determines to apply a system configuration corresponding to a current value of the S-SFH change count. In more detail, from a next superframe after one or two transmissions of the updated SPx are completed, the BS can apply the system configuration corresponding to the current value of the S-SFH change count. At this time, the BS can differently apply the number of times of transmission depending on the kind of the SPx. For example, in case that an SP1 or SP2 is changed, after one or two transmissions of the updated SP1 or SP2 is completed, the BS can apply a system configuration corresponding to a current value of an S-SFH change count. In case that an SP3 is changed, after the updated SP3 is transmitted one time, the BS can apply a system configuration corresponding to a current value of an S-SFH change count. At this time, in case that a plurality of SPx are changed, the BS desirably applies a system configuration corresponding to a current value of an S-SFH change count at the latest application time point among application time points dependent on respective SPx.

For further example, whether to apply the system configuration corresponding to the previous value of the S-SFH change count can be determined depending on whether a predetermined number of superframes from an increase of the S-SFH change count have lapsed. In this case, if the predetermined number of superframes has not lapsed, the BS determines to apply the system configuration corresponding to the previous value of the S-SFH change count.

For still another example, the system configuration corresponding to the current value of the S-SFH change count can be applied at the same time of the increase of the S-SFH change count. At this time, the BS determines to apply the system configuration corresponding to the current value of the S-SFH change count, from a superframe in which the S-SFH change count increases. Accordingly, the BS sets the CTF to '0'.

As described above, a time point of applying a system configuration corresponding to a current value of an S-SFH change count can be determined according to various schemes. In any case, an MS also can make its own judgment on the time point of applying the system configuration corresponding to the current value of the S-SFH change count, as in a scheme dependent on completion or non-completion of one or two transmissions of an updated SPx, a scheme dependent on lapse or non-lapse of a predetermined number of superframes, a scheme applying at the same time of an increase of an S-SFH change count, etc. among the aforementioned exemplary embodiments. In this case, the MS can apply the system configuration corresponding to the current value of the S-SFH change count at the time point on which the MS makes its own judgment without referring to the CTF.

For example, the scheme dependent on the transmission or non-transmission of the updated SPx is described below. Because an SPx, i.e., an SP1, an SP2, and an SP3 each are transmitted at a predetermined interval of superframes according to each period, an MS can determine a superframe in which the corresponding SPx is received using a superframe number and a transmission period of each SPx. Thus, the MS recognizes the changed SPx through an S-SFH SP change bitmap, determines a time point of transmission of the SPx, and applies a system configuration corresponding to a current value of an S-SFH change count, from a next superframe of the superframe in which the SPx is received. In more detail, in case that the S-SFH SP change bitmap is equal to '0b010', the MS determines that the SP2 has been updated through the S-SFH SP change bitmap. And, the MS determines a next time point of transmission of the SP2 using a current superframe number and a transmission period of the SP2, and applies a system configuration corresponding to a current value of an S-SFH change count reflecting the updated SP2, from a next superframe of a superframe in which two transmissions of the updated SP2 are completed.

The following description is made with reference to operations and constructions of a BS and an MS transmitting/receiving system information as described above.

Figure 3:
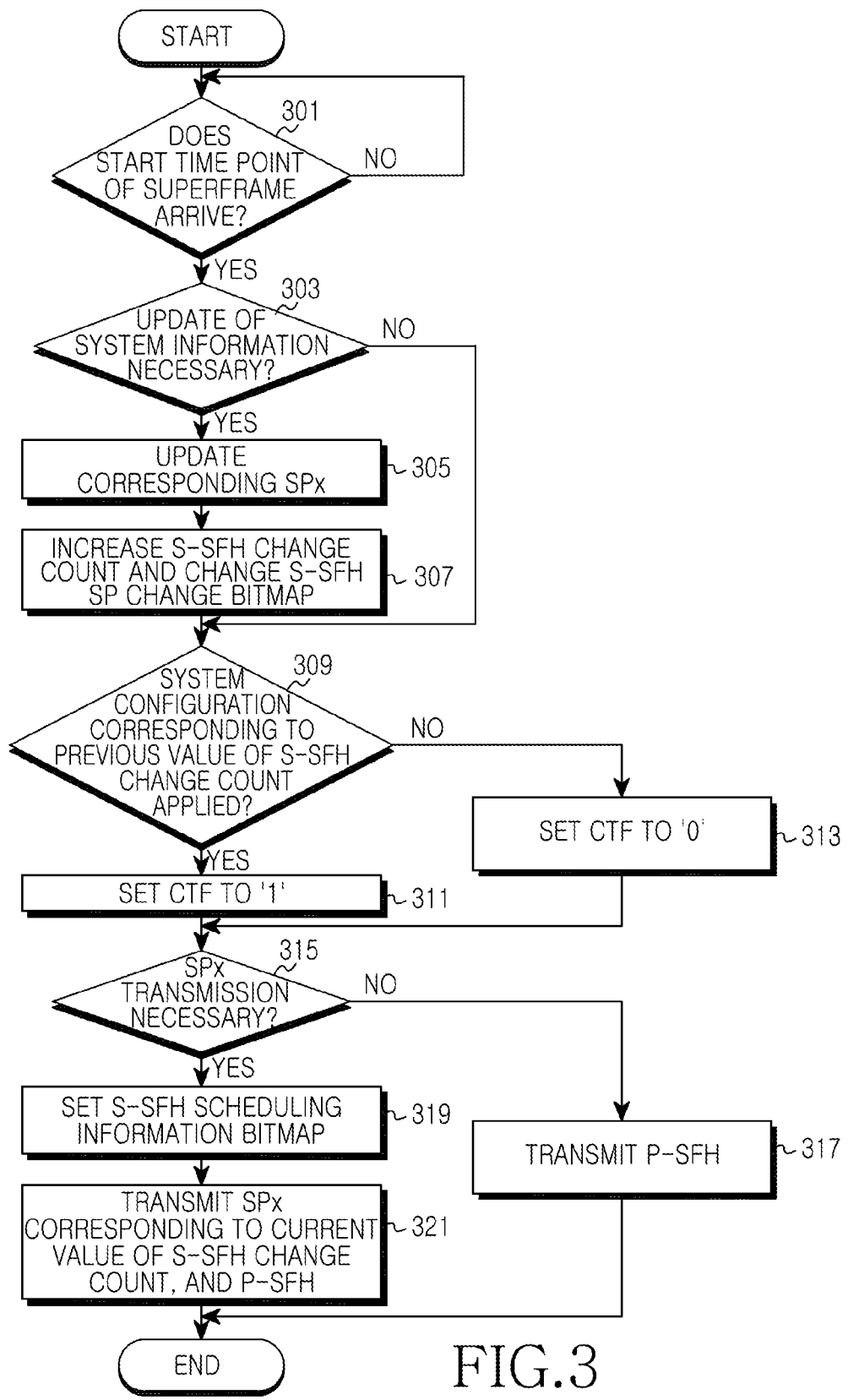
FIG. 3 is a flow diagram illustrating a system information transmission procedure of a Base Station (BS) in a broadband wireless communication system according to an exemplary embodiment of the present invention.

FIG. 3 illustrates a system information transmission procedure of a BS in a broadband wireless communication system according to an exemplary embodiment of the present invention.

Referring to FIG. 3, in step 301, the BS determines if a start time point of a superframe has arrived. In other words, the BS determines if a time point having to transmit an SFH has arrived.

If it is determined in step 301 that the start time point of the superframe has arrived, the BS proceeds to step 303 and determines if update of system information is necessary. Here, the system information includes a P-SFH and an S-SFH, and the S-SFH is divided into a plurality of SPx. For example, the update of the system information is accomplished by subchannelization, ranging, and a change of system setting such as a map version and the like. That is, the BS determines if there is a need for update of an SPx transmitted through an SFH due to the change of the system setting.

If it is determined in step 303 that there is the need for the update of the system information, the BS proceeds to step 305 and updates a corresponding SPx. That is, the BS updates an SPx including a parameter reflecting the changed system setting. At this time, one or a plurality of SPx can be updated. On the contrary, if it is determined in step 303 that there is no need for the update of the system information, the BS proceeds to step 309.

After updating the SPx in step 305, the BS proceeds to step 307 and changes an S-SFH change count and an S-SFH SP change bitmap. The S-SFH change count and the S-SFH SP change bitmap are parameters included in the P-SFH. The S-SFH change count represents update or non-update of an SPx, and the S-SFH SP change bitmap indicates the updated SPx. A value of the S-SFH change count increases with the update of the SPx, and increases only by the number of times of update irrespective of the number of the updated SPx. The S-SFH SP change bitmap is a bit stream having a length as much as the number of SPx used in the system and, at the SPx update, a bit value of a position corresponding to the updated SPx is changed.

After changing the S-SFH change count and the S-SFH SP change bitmap in step 307, the BS proceeds to step 309 and determines whether to apply a system configuration corresponding a previous value of the S-SFH change count. Here, a criterion of whether to apply the system configuration corresponding to the previous value of the S-SFH change count can be different according to a concrete exemplary embodiment. For example, the BS determines whether to apply the system configuration corresponding to the previous value of the S-SFH change count in accordance with at least one of a condition that MSs accessing the BS have received all of updated SPx, a condition that transmission of at least one updated SPx has been accomplished 'N' number of times or more after the S-SFH change count increases, and a condition that a predetermined number of superframes from the increase of the S-SFH change count have lapsed. That is, in case that at least one of the conditions is satisfied, the BS determines to apply the system configuration corresponding to the current value of the S-SFH change count.

If it is determined in step 309 that the system configuration corresponding to the previous value of the S-SFH change count will be applied, the BS proceeds to step 311 and sets a parameter representing the applied system configuration, e.g., a CTF or an S-SFH application hold indicator to '1'. On the contrary, if it is determined in step 309 that a system configuration corresponding to a current value of the S-SFH change count will be applied, the BS proceeds to step 313 and sets the CTF to '0'. The CTF or the S-SFH application hold indicator, which is a parameter representing which system configuration is applied, is included in the P-SFH. For description convenience, the parameter is called the CTF below in the present invention.

After that, the BS proceeds to step 315 and determines if there is a need to transmit an SPx. For example, each SPx can be transmitted according to its own period. In this case, the BS identifies the period of the each SPx, and determines if a transmission period has arrived. For another example, in case that a specific SPx is updated, the specific SPx can be either transmitted at the same time of the update or can be transmitted after lapse of a predetermined frame from the update. In case that a plurality of SPx are simultaneously changed, the plurality of SPx are transmitted over a plurality of superframes because they cannot be transmitted through one subframe. In this case, the BS determines that there is a need to transmit the SPx every superframe in regular sequence.

If it is determined in step 315 that the transmission of the SPx is not necessary, the BS proceeds to step 317 and transmits a P-SFH through an SFH. Here, the P-SFH includes the S-SFH change count, the S-SFH SP change bitmap, the CTF, and an S-SFH scheduling information bitmap. At this time, the S-SFH scheduling information bitmap is set to a value representing that the SPx is not transmitted.

On the contrary, if it is determined in step 315 that the transmission of the SPx is necessary, the BS proceeds to step 319 and sets an S-SFH scheduling information bitmap. The S-SFH scheduling information bitmap is a bitmap having a length as much as the number of SPx used in the system and, at the SPx transmission, a bit value of a position corresponding to the transmitted SPx is set to '1'. That is, the BS generates SPx transmission and corresponding SPx designation information using the S-SFH scheduling information bitmap such that an MS can decode the SPx.

After setting the S-SFH scheduling information bitmap in step 319, the BS proceeds to step 321 and transmits both the SPx corresponding to the current value of the S-SFH change count and the P-SFH through the SFH. Here, the P-SFH includes the S-SFH change count, the S-SFH SP change bitmap, the CTF, and the S-SFH scheduling information bitmap.

Figure 4:
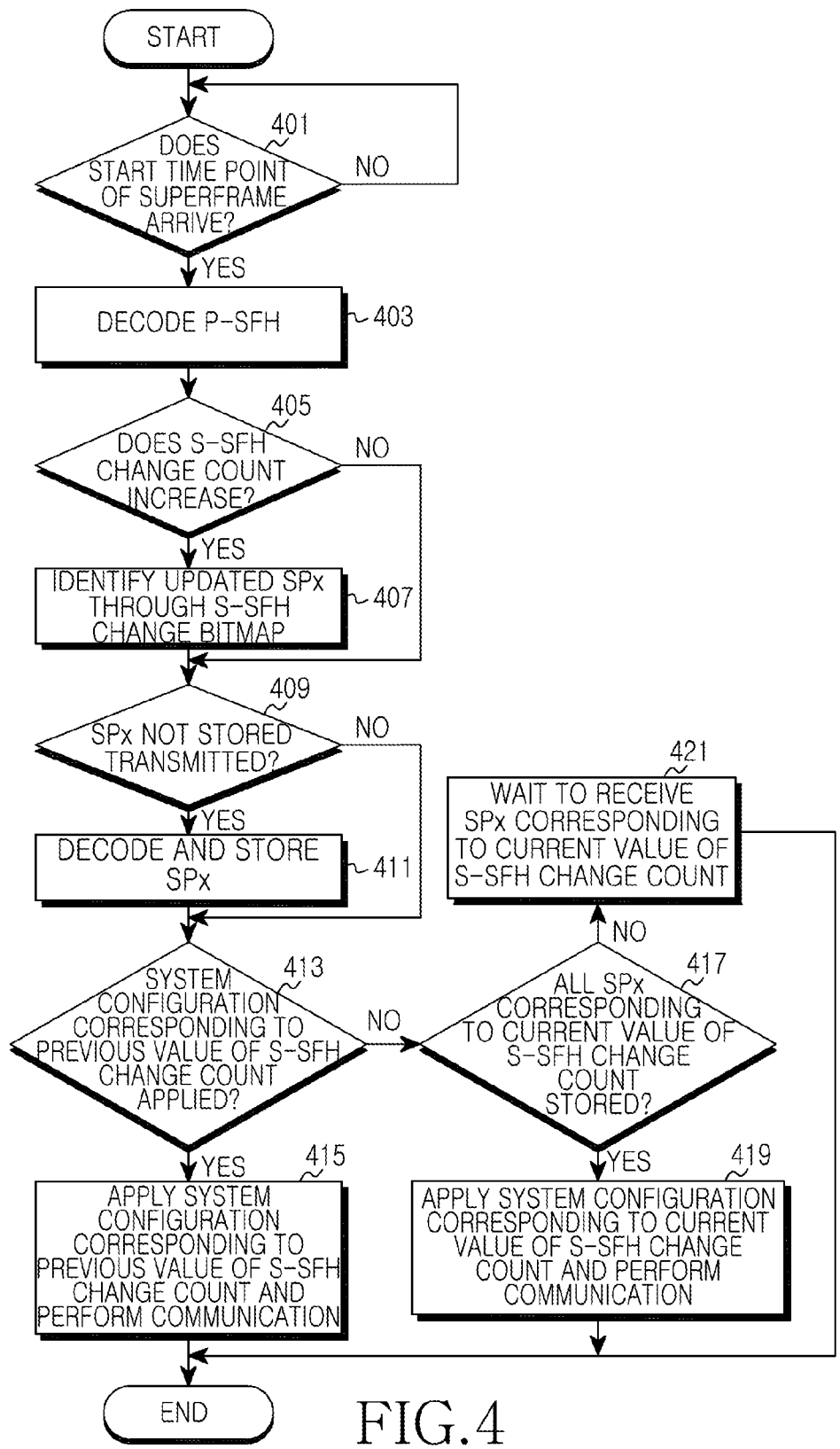
FIG. 4 is flow diagram illustrating a system information acquisition procedure of a Mobile Station (MS) in a broadband wireless communication system according to an exemplary embodiment of the present invention.

FIG. 4 illustrates a system information acquisition procedure of an MS in a broadband wireless communication system according to an exemplary embodiment of the present invention.

Referring to FIG. 4, in step 401, the MS determines if a start time point of a superframe has arrived. In other words, the MS determines if a time point having to receive an SFH has arrived.

If it is determined in step 401 that the start time point of the superframe has arrived, the MS proceeds to step 403 and decodes a P-SFH. Because the P-SFH is coded in a predefined coding scheme, and is received through a predefined position of the SFH, the MS can decode the P-SFH even without separate allocation information. By decoding the P-SFH, the MS acquires system information, an S-SFH change count, an S-SFH SP change bitmap, an S-SFH scheduling information bitmap, and a parameter representing an applied system configuration. Here, the parameter representing the system configuration applied can be called a CTF or an S-SFH application hold indicator. For description convenience, the parameter is called the CTF below in the present invention.

After decoding the P-SFH, the MS proceeds to step 405 and determines if the S-SFH change count has increased. In more detail, the MS compares an S-SFH change count included in a previously received P-SFH with an S-SFH change count included in a currently received P-SFH, and determines if the S-SFH change count has increased. If it is determined in step 405 that the S-SFH change count has have increased, the MS proceeds to step 409.

On the contrary, if it is determined in step 405 that the S-SFH change count has increased in step 405, the MS proceeds to step 407 and identifies the updated at least one SPx through the S-SFH SP change bitmap. That is, the increase of the S-SFH change count indicates the update of the at least one SPx. Thus, the MS recognizing the update of the at least one SPx through the increase of the S-SFH change count determines which SPx has been updated through the S-SFH SP change bitmap included in the P-SFH. At this time, an indication of the updated SPx through the S-SFH SP change bitmap is achieved in such a scheme that a bit corresponding to the updated SPx is toggled or is set to a value indicating update. In case of the toggling scheme, the MS determines which SPx has been updated by identifying a position of a toggled bit compared to an S-SFH SP change bitmap included in the previously received P-SFH. On the other hand, in case of the setting scheme to the value indicating the update, the MS determines which SPx has been updated by identifying a position of a bit set to a corresponding value (e.g., '1').

After identifying the updated at least one SPx in step 407, the MS proceeds to step 409 and determines if an SPx not stored is transmitted. The transmission or non-transmission of the SPx not stored is determined through the S-SFH scheduling information bitmap. In more detail, the MS determines if the SPx not stored is transmitted by determining whether a bit set to '1' exists in the S-SFH scheduling information bitmap and, in case that the SPx not stored is transmitted, the MS determines which SPx is transmitted through a position of the bit set to '1' and determines if it has decoded and stored the transmitted SPx in a state of a current value of the S-SFH change count. If it is determined in step 409 that the SPx not stored is not transmitted, the MS jumps to step 413.

On the contrary, if it is determined in step 409 that the SPx not stored is transmitted, the MS proceeds to step 411 and decodes the SPx and stores system information included in the SPx. At this time, because application of the updated SPx can be postponed, the MS does not discard an SPx before update. That is, the MS classifies and stores SPx according to a value of the S-SFH change count. Thus, the MS stores at least two pieces of system information, i.e., both system information corresponding to a current value of the S-SFH change count and system information corresponding to a previous value of the S-SFH change count, respectively.

The MS proceeds to step 413 and determines if a system configuration corresponding to the previous value of the S-SFH change count is applied in the present superframe. At this time, according to an exemplary embodiment of the present invention, the application or non-application of the system configuration corresponding to the previous value of the S-SFH change count is determined through the CTF. On the contrary, according to another exemplary embodiment of the present invention, the MS can determine if the system configuration corresponding to the previous value of the S-SFH change count is applied in accordance with a predefined condition without using the CTF. For example, under the satisfaction of a condition that transmission of at least one updated SPx is accomplished 'N' number of times or more after the S-SFH change count increases, in case that a system configuration corresponding to a current value of the S-SFH change count is applied, the MS identifies an updated at least one SPx in step 407 and determines next time points of transmission of the updated at least one SPx. And, the MS determines that it will apply the system configuration corresponding to the previous value of the S-SFH change count up to a superframe in which the updated at least one SPx is transmitted 'N' number of times. At this time, the 'N' can be equal to '2' for an SP1 or SP2, and can be equal to '1' for an SP3.

If it is determined in step 413 that the system configuration corresponding to the previous value of the S-SFH change count is applied, the MS proceeds to step 415 and applies the system configuration corresponding to the previous value of the S-SFH change count and performs communication. In other words, the MS performs communication according to the system configuration dependent on SPx received before the S-SFH change count is increased to a current value.

On the contrary, if it is determined in step 413 that the system configuration corresponding to the previous value of the S-SFH change count is not applied, in other words, if the system configuration corresponding to the current value of the S-SFH change count is applied, the MS proceeds to step 417 and determines if it has stored all SPx corresponding to the current value of the S-SFH change count.

If it is determined in step 417 that all the SPx corresponding to the current value of the S-SFH change count are stored, the MS proceeds to step 419 and applies the system configuration corresponding to the current value of the S-SFH change count, and performs communication.

On the contrary, if it is determined in step 417 that all the SPx corresponding to the current value of the S-SFH change count are not stored, the MS proceeds to step 421 and waits to receive the SPx corresponding to the current value of the S-SFH change count. In other words, the MS stops communication until storing all the SPx corresponding to the current value of the S-SFH change count.

Figure 5:
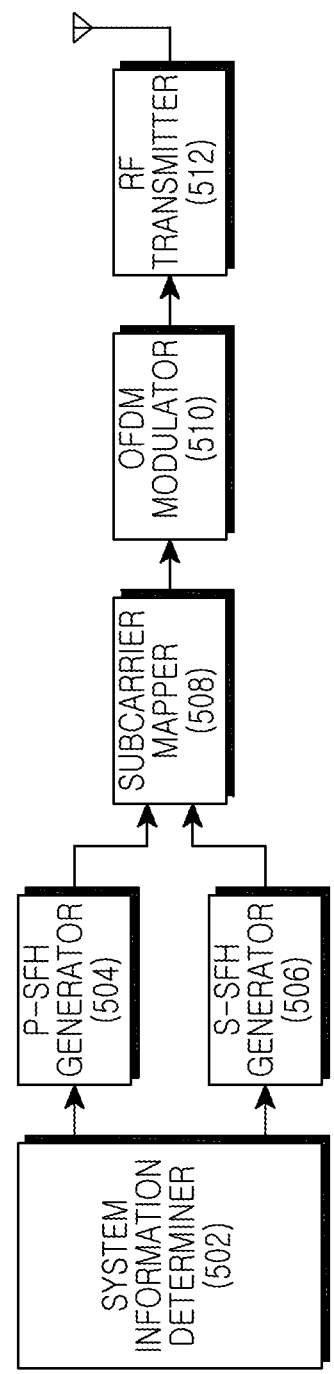
FIG. 5 is a block diagram illustrating a construction of a BS in a broadband wireless communication system according to an exemplary embodiment of the present invention.

FIG. 5 illustrates a construction of a BS in a broadband wireless communication system according to an exemplary embodiment of the present invention.

Referring to FIG. 5, the BS includes a system information determiner 502, a P-SFH generator 504, an S-SFH generator 506, a subcarrier mapper 508, an OFDM modulator 510, and a Radio Frequency (RF) transmitter 512.

The system information determiner 502 determines system information to be provided to MSs. That is, the system information determiner 502 determines values of parameters included in a P-SFH and an S-SFH. The system information determiner 502 reflects a change of system setting, updates the system information, and provides the update of the system information to the P-SFH generator 504 and the S-SFH generator 506.

More particularly, the system information determiner 502 sets an S-SFH change count and an S-SFH SP change bitmap depending on SPx update or non-update, and the system information determiner 502 sets an S-SFH scheduling information bitmap depending on SPx transmission or non-transmission. Also, the system information determiner 502 sets the CTF depending on application or non-application of a system configuration corresponding to a previous value of the S-SFH change count. Here, a criterion of whether to apply the system configuration corresponding to the previous value of the S-SFH change count can be different according to a concrete exemplary embodiment. For example, when satisfying at least one of a condition that MSs accessing the BS have received all of updated SPx, a condition that transmission of at least one updated SPx has been accomplished 'N' number of times or more after the S-SFH change count increases, and a condition that a predetermined number of superframes from the increase of the S-SFH change count have lapsed, the system information determiner 502 determines to apply a system configuration corresponding to a current value of the S-SFH change count.

The P-SFH generator 504 generates a P-SFH that includes system information, an S-SFH change count, an S-SFH SP change bitmap, an S-SFH scheduling information bitmap, and a CTF. Because the P-SFH is transmitted through an SFH, the P-SFH generator 504 generates the P-SFH at a start time point of a superframe. The S-SFH generator 506 generates SPx including system information. Because the SPx are selectively transmitted according to their own period or defined rule, the S-SFH generator 506 generates the SPx if a transmission time point arrives.

The subcarrier mapper 508 maps a transmit signal to resources. More particularly, the subcarrier mapper 508 maps both the P-SFH provided from the P-SFH generator 504 and the SPx provided from the S-SFH 506 within the SFH. The OFDM modulator 510 converts signals mapped to a frequency domain into time domain signals through Inverse Fast Fourier Transform (IFFT) operation, and generates OFDM symbols by inserting a Cyclic Prefix (CP). The RF transmitter 512 up converts the OFDM symbols into an RF band signal, amplifies a signal, and transmits the amplified signal through an antenna.

Figure 6:
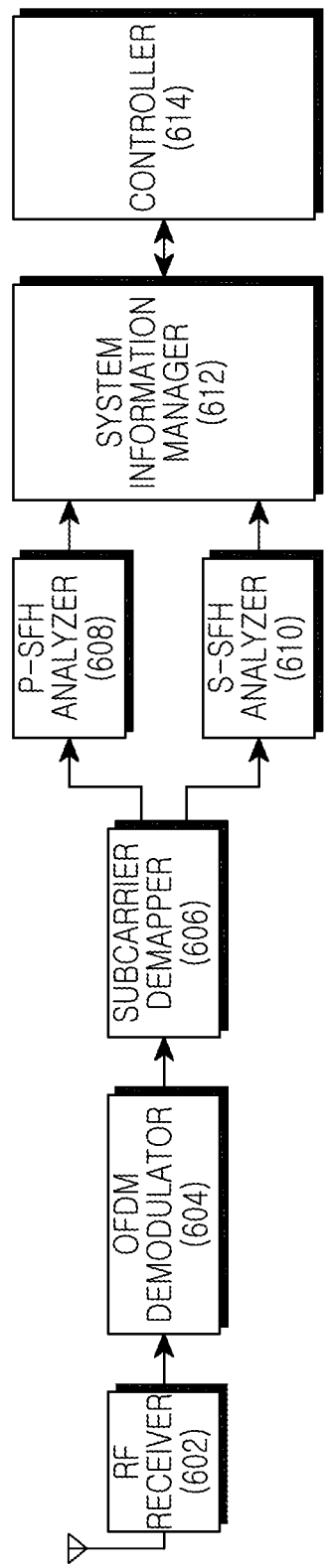
FIG. 6 is a block diagram illustrating a construction of an MS in a broadband wireless communication system according to an exemplary embodiment of the present invention.

FIG. 6 illustrates a construction of an MS in a broadband wireless communication system according to an exemplary embodiment of the present invention.

Referring to FIG. 6, the MS includes an RF receiver 602, an OFDM demodulator 604, a subcarrier demapper 606, a P-SFH analyzer 608, an S-SFH analyzer 610, a system information manager 612, and a controller 614.

The RF receiver 602 amplifies an RF band signal received through an antenna, and down converts the RF band signal into a baseband signal. The OFDM demodulator 604 divides the signal from the RF receiver 602 in a unit of an OFDM symbol, and restores signals mapped to a frequency domain through Fast Fourier Transform (FFT) operation. The subcarrier demapper 606 classifies signals mapped to the frequency domain in a unit of processing. For example, the unit of processing can be a traffic burst, a message, and the like.

By demodulating and decoding a P-SFH received from a BS, the P-SFH analyzer 608 acquires system information, and provides the acquired system information to the system information manager 612. Also, the P-SFH analyzer 608 acquires parameters of an S-SFH change count, an S-SFH SP change bitmap, an S-SFH scheduling information bitmap, a CTF, etc. from the P-SFH, and provides the parameters to the system information manager 612. By demodulating and decoding an SPx received from the BS, the S-SFH analyzer 610 acquires system information, and provides the acquired system information to the system information manager 612.

The system information manager 612 stores the system information provided from the P-SFH analyzer 608 and the S-SFH analyzer 610, and provides the system information to the controller 614 for the sake of an operation of the MS. More particularly, the system information manager 612 provides system information stored to reflect a currently applied system configuration in the system, using the S-SFH change count, the S-SFH SP change bitmap, the S-SFH scheduling information bitmap, and the CTF. The controller 614 controls a function for an operation of the MS. More particularly, the controller 614 controls to perform communication according to the system information provided from the system information manager 612.

An exemplary operation of the system information manager 612 for management of the system information is described below. The system information manager 612 identifies update of an SPx through an increase of the S-SFH change count, and identifies the updated SPx through the S-SFH SP change bitmap. If the updated SPx is identified, the system information manager 612 determines if an SPx not stored is transmitted through the S-SFH scheduling information bitmap. If the SPx not stored is transmitted, the system information manager 612 controls the S-SFH analyzer 610 to decode the SPx. And, if the system information included in the updated SPx is provided from the S-SFH analyzer 610, the system information manager 612 stores the system information. At this time, because application of the updated SPx can be postponed, the MS does not discard an SPx before update. In more detail, the system information manager 612 stores at least two pieces of system information, i.e., both system information corresponding to a current value of the S-SFH change count and system information corresponding to a previous value of the S-SFH change count, respectively and, according to an applied system configuration, the system information manager 612 provides corresponding system information to the controller 614. In a more detailed description, the system information manager 612 determines whether the system configuration corresponding to the previous value of the S-SFH change count is applied or the system configuration corresponding to the current value of the S-SFH change count is applied, using the CTF provided from the P-SFH analyzer 608, and provides the system information dependent on the applied system configuration to the controller 614. However, according to another exemplary embodiment of the present invention, the system information manager 612 can determine if the system configuration corresponding to the previous value of the S-SFH change count is applied in accordance with a predefined condition without using the CTF. For example, under the satisfaction of the condition that transmission of at least one updated SPx is accomplished 'N' number of times or more after the S-SFH change count increases, in case that the system configuration corresponding to the current value of the S-SFH change count is applied, the system information manager 612 identifies an updated at least one SPx through the S-SFH SP change bitmap and determines next time points of transmission of the updated at least one SPx. And, the system information manager 612 determines that it will apply the system configuration corresponding to the previous value of the S-SFH change count up to a superframe in which the updated at least one SPx is transmitted 'N' number of times. At this time, the 'N' can be equal to '2' for an SP1 or an SP2, and can be equal to '1' for an SP3.

Exemplary embodiments of the present invention can minimize an operation disable state resulting from non-reception of system information, by informing an MS of a time point of application of updated system information in a broadband wireless communication system. Also, exemplary embodiments of the present invention provide an effective method for allowing, especially, an MS pausing and resuming communication as in an idle mode, a sleep mode, etc., to recognize a change of system information and be aware of a time point of application of the changed system information.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An operation method of a base station in a wireless communication system, the method comprising:
   generating system information comprising a first parameter set and a second parameter set; and
   transmitting the system information to a mobile terminal,
   wherein the first parameter set comprises an indicator, a change count, a change bitmap, and scheduling information,
   wherein the indicator indicates to apply contents of the second parameter set associated with a second value, different from a first value, of the change count, and
   wherein the second value is a previous value of the change counter which is currently set to the first value.

2. The method of claim 1, further comprising:
   if the second parameter set is changed, increasing the change count.

3. The method of claim 1, wherein the second parameter set is divided into a plurality of Sub Packets (SPs), the method further comprising:
   changing at least one SP; and
   changing at least one bit corresponding to the changed at least one SP in the change bitmap for identifying which SP is changed, wherein the change bitmap is included in the first parameter set.

4. The method of claim 1, further comprising:
changing the second parameter set; and
determining whether to apply the contents of the changed second parameter set.

5. An operation method of a mobile station in a wireless communication system, the method comprising:
receiving system information from a base station, the system information comprising a first parameter set and a second parameter set, wherein the first parameter set comprises an indicator, a change count, a change bitmap, and scheduling information,
wherein the indicator indicates to apply contents of the second parameter set associated with a second value, is different from a first value, of the change count, and
wherein the second value is a previous value of the change counter which is currently set to the first value.

6. The method of claim 5, wherein the second parameter set is divided into a plurality of Sub Packets (SPs), and wherein the change bitmap identifies which SP is changed.

7. A base station apparatus in a wireless communication system, the apparatus comprising:
a generator for generating system information comprising a first parameter set and a second parameter set; and
a transmitter for transmitting the system information to a mobile terminal,
wherein the first parameter set comprises an indicator, a change count, a change bitmap, and scheduling information,
wherein the indicator indicates to apply contents of the second parameter set associated with a second value, different from a first value, of the change count, and
wherein the second value is a previous value of the change counter which is currently set to the first value.

8. The apparatus of claim 7, further comprising:
a determiner for, if the second parameter set is changed, increasing the change count.

9. The apparatus of claim 8, wherein the second parameter set is divided into a plurality of Sub Packets (SPs), the apparatus further comprising:
a determiner for changing at least one SP, and for changing at least one bit corresponding to the changed at least one of SPs in the change bitmap for identifying which SP is changed, wherein the change bitmap is included in the first parameter set.

10. The apparatus of claim 8, further comprising:
a determiner for changing the second parameter set and for determining whether to apply the contents of the changed second parameter set.

11. A mobile station apparatus in a wireless communication system, the apparatus comprising:
a receiver for receiving system information from a base station, the system information comprising a first parameter set and a second parameter set,
wherein the first parameter set comprises an indicator, a change count, a change bitmap, and scheduling information,
wherein the indicator indicates to apply contents of the second parameter set associated with a second value, different from a first value, of the change count, and
wherein the second value is a previous value of the change counter which is currently set to the first value.

12. The apparatus of claim 11, wherein the second parameter set is divided into a plurality of Sub Packets (SPs), and wherein the change bitmap identifies which SP is changed.

13. The method if claim 4, wherein the second parameter set is divided into a plurality of Sub Packets (SPs), and
wherein the determining of whether to apply the contents of the changed second parameter set comprises,
if a predefined number of transmissions of the changed SP is completed after the SP is changed, determining to apply the contents of the changed SP.

14. The method of claim 1, wherein the second parameter set is divided into a Sub Packet 1 (SP1), a Sub Packet 2 (SP2), and a Sub Packet 3 (SP3) that are periodically transmitted at different intervals,
when the SP 1 is changed, changed content of the SP 1 is applied in a superframe following a second regularly scheduled transmission of the changed SP1,
when the SP2 is changed, changed content of the SP2 is applied in a superframe following a second regularly scheduled transmission of the changed SP2, and
when the SP3 is changed, changed content of the SP3 is applied in a superframe following a first regularly scheduled transmission of the changed SP3.

15. The method of claim 1, wherein the second parameter set comprises a plurality of Sub Packets (SPs), the method further comprising:
if a regularly scheduled transmission time for a changed SP is arrived, transmitting the changed SP.

16. The method of claim 1, wherein the change count is increased upon changing of the second parameter set.

17. The method of claim 6, further comprising:
determining whether to update at least one parameter within the SPs based on the change count, the change bitmap and the indicator.

18. The method of claim 17, wherein the determining of whether to update the at least one parameter within the changed SP comprises,
determining whether a value of a change count recently received is identical to the first value;
if the value of the change count recently received is identical to the first value, discarding SPs during a period where change count remains unchanged;
if a difference between the value of the change count recently received and the first value is one, updating a SP whose bit in the change bitmap is changed; and
if the difference between the value of the change count recently received and the first value is greater than one, updating all SPs.

19. The method of claim 5, wherein the change count is increased upon changing of the second parameter set.

20. The apparatus of claim 10, wherein the second parameter set is divided into a plurality of Sub Packets (SPs), and
wherein, if a predefined number of transmissions of the changed SP is completed after the SP is changed, the determiner determines to apply the contents of the changed SP.

21. The apparatus of claim 7, wherein the second parameter set is divided into a Sub Packet 1 (SP1), a Sub Packet 2 (SP2), and a Sub Packet 3 (SP3) that are periodically transmitted at different intervals,
when the SP 1 is changed, changed content of the SP 1 is applied in a superframe following a second regularly scheduled transmission of the changed SP1,
when the SP2 is changed, changed content of the SP2 is applied in a superframe following a second regularly scheduled transmission of the changed SP2, and
when the SP3 is changed, changed content of the SP3 is applied in a superframe following a first regularly scheduled transmission of the changed SP3.

22. The apparatus of claim 7, wherein the second parameter set comprises a plurality of SPs, and
  wherein, if a regularly scheduled transmission time for the changed SP is arrived, the transmitter transmits the changed SP.

23. The apparatus of claim 7, wherein the change count is increased upon changing of the second parameter set.

24. The apparatus of claim 12, wherein the controller determines whether to update a at least one parameter within the SPs based on the change count, the change bitmap and the indicator.

25. The apparatus of claim 24, wherein the controller determines whether a value of a change count recently received is identical to the first value, if the value of the change count recently received is identical to the first value, discarding SPs during a period where the change count remains unchanged, if a difference between the value of the change count recently received and the first value is one, updating a SP whose bit in the change bitmap is changed, and if the difference between the value of the change count recently received and the first value is greater than one, updating all SPs.

26. The apparatus of claim 12, wherein the change count is increased upon changing of the second parameter set.

27. The method of claim 1, wherein the second value is determined by subtracting 1 from the first value.

28. The method of claim 5, wherein the second value is determined by subtracting 1 from the first value.

29. The method of claim 5, further comprising:
  applying contents of the second parameter set associated with a second value of the change count.

30. The method of claim 5, further comprising:
  receiving another system information comprising the first parameter set, wherein the first parameter set comprises the change count set to the first value and the indicator indicates to apply contents of the second parameter set associated with the first value of the change count.

31. The method of claim 7, wherein the second value is determined by subtracting 1 from the first value.

32. The apparatus of claim 11, wherein the second value is determined by subtracting 1 from the first value.

33. The apparatus of claim 11, further comprising:
  a controller for applying contents of the second parameter set associated with a second value of the change count.

34. The apparatus of claim 11, wherein the receiver receives another system information comprising the first parameter set, wherein the first parameter set comprises the change count set to the first value and the indicator indicates to apply contents of the second parameter set associated with the first value of the change count.

\* \* \* \* \*